United States Patent
Nishizawa et al.

[11] Patent Number: 6,081,906
[45] Date of Patent: Jun. 27, 2000

[54] MULTI-THREAD PROCESSING WITH QUEUING AND RECOVERY

[75] Inventors: Takeshi Nishizawa, Torrance; David P. Nesbitt, Redondo Beach; Ton H. Truong, Westminster, all of Calif.

[73] Assignees: Fuji Xerox Co., Ltd., Tokyo, Japan; Xerox Corporation, Stamford, Conn.

[21] Appl. No.: 08/975,860

[22] Filed: Nov. 21, 1997

[51] Int. Cl.$^7$ ............................................. G06F 11/00
[52] U.S. Cl. ................................. 714/2; 395/680
[58] Field of Search ................................. 714/2, 4, 5, 7, 714/11, 16, 20, 25, 31, 39, 41, 42, 12, 21, 47, 48; 395/680, 704, 250, 292, 200.64, 575, 672

[56] References Cited

U.S. PATENT DOCUMENTS

| | | | |
|---|---|---|---|
| 4,949,251 | 8/1990 | Griffin et al. | 364/200 |
| 5,014,221 | 5/1991 | Mogul | 364/519 |
| 5,485,626 | 1/1996 | Lawlor et al. | 395/650 |
| 5,625,846 | 4/1997 | Kobayakawa et al. | 395/872 |
| 5,659,687 | 8/1997 | Kim et al. | 395/292 |
| 5,673,381 | 9/1997 | Huai et al. | 395/180 |
| 5,794,047 | 8/1998 | Meier | 395/704 |
| 5,796,934 | 8/1998 | Bhanot et al. | 395/182.02 |
| 5,799,173 | 8/1998 | Gossler et al. | 395/500 |
| 5,802,371 | 9/1998 | Meier | 395/704 |
| 5,859,975 | 1/1999 | Brewer et al. | 395/200.43 |
| 5,864,738 | 1/1999 | Kessler et al. | 395/200.69 |
| 5,872,904 | 2/1999 | McMillen et al. | 395/182.02 |
| 5,872,963 | 2/1999 | Bitar et al. | 395/580 |
| 5,887,168 | 3/1999 | Bahls et al. | 395/680 |

*Primary Examiner*—Nadeem Iqbal
*Attorney, Agent, or Firm*—Oliff & Berridge, PLC

[57] ABSTRACT

A method and apparatus for parallel processing of remote procedure call (RPC) requests from clients includes placing the remote procedure call requests in a queue and storing them in a memory. A response is immediately returned to the client indicating receipt of the processing request. The RPC requests are retrieved from the queue and processed in parallel. Notification of the completed processing is provided to a notification client. In the event of a server fault or system failure, the processing requests are retrieved from the memory upon system restoration, and replaced into the queue in the order they were received by the server.

20 Claims, 11 Drawing Sheets

MULTI-THREAD PROCESSING WITH QUEUING AND RECOVERY

BACKGROUND OF THE INVENTION

1. Field of Invention

This invention relates to an apparatus and a method for queuing requests from clients and for returning a response to the client. The invention also ensures recovery of requests left in a database without being processed.

2. Description of Related Art

Memory structures are used frequently when implementing processes on computer systems. Two memory structures that are often implemented in a variety of applications are the first-in-first-out (FIFO) or queue, and the last-in-first-out (LIFO) or stack. Data is stored in sequence in both types of memory structures. In the queue, the data is retrieved in the same order in which it was stored, while in the stack, the data is retrieved in the reverse order in which it was stored. Many types of operating systems, application programs and other programs make use of queues. While the operating system is performing one request, additional requests are stored in the queue and are implemented in the order that they arrive. Such buffering activities are a common use of the queue memory structure in other applications as well, such as when receiving data at a communications port of a computer. The incoming data at the communications port may be received at a faster rate than the data can be processed, and a queue allows the two data rates to be synchronized by inserting incoming data in the queue at the incoming data rate and removing data at the rate of the processor.

In a distributed processing system using a server and a number of clients, processing requests from several clients can arrive at the server simultaneously, or substantially simultaneously. If, for example, two processing requests arrive at the server at approximately the same time, one of the processing requests will be delayed in processing until the other has completed processing. Thus, a response to the delayed processing request will also be delayed in being returned to the client.

SUMMARY OF THE INVENTION

This invention provides an apparatus and a method for multi-thread processing of concurrent processing requests. The invention also provides a method and apparatus for recovery of requests left in a database without being processed.

To implement the multi-thread processing with queuing, a remote procedure call (RPC) server is provided with a memory request queue and an in-disk request database. When the RPC server receives an RPC request, it puts the request in the queue and saves the request in the request database. The RPC server then notifies a background thread of the arrival of the new request and returns a response immediately. The RPC requests in the queue are picked up by the background thread, which then spawns threads for processing the RPC requests. If the RPC server malfunctions during processing, such that a RPC request is not completed, the RPC server may retrieve the RPC request from the in-disk memory, and then process the RPC request.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Figure 1:
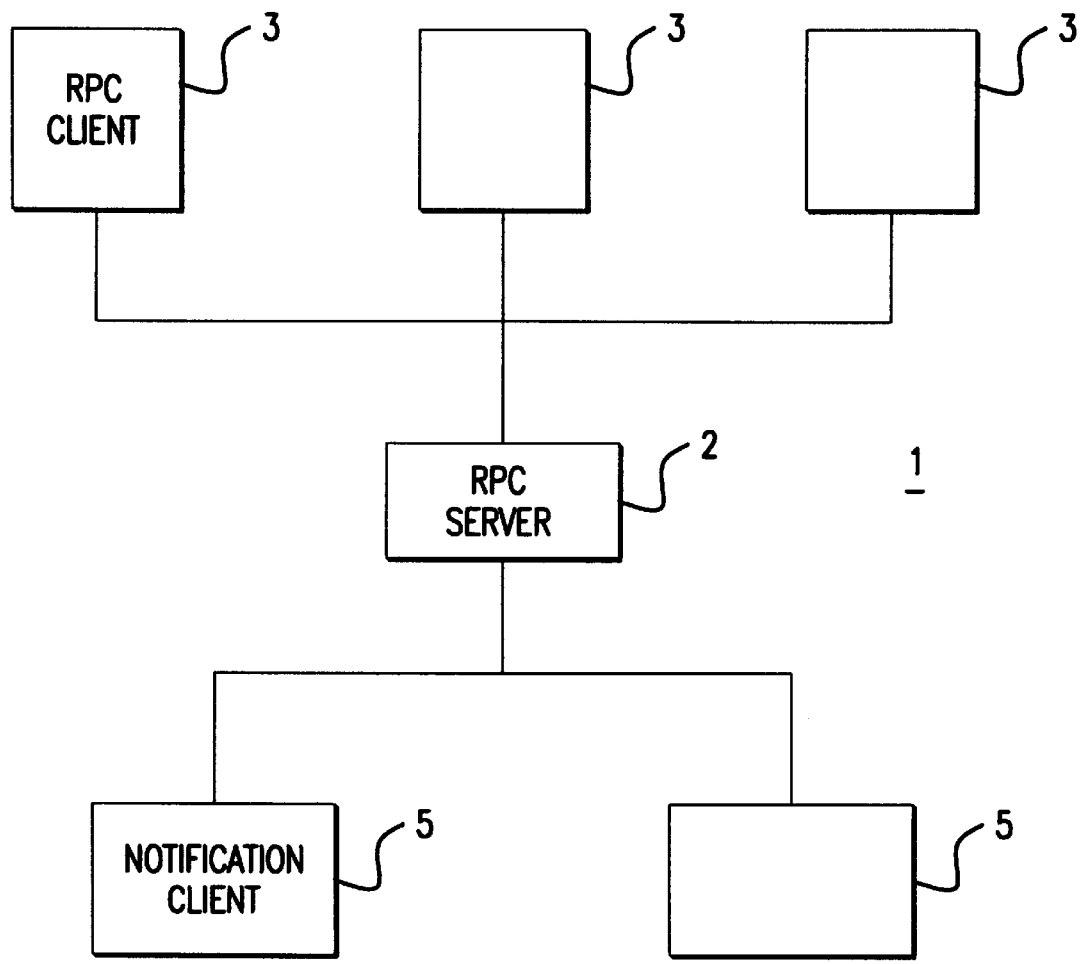
FIG. 1 is a block diagram of a distributed process system using single-thread processing.

FIG. 1 shows a distributed processing system 1, which includes an RPC server 2, RPC clients 3 and notification clients 5. The RPC clients 3 communicate requests to the RPC server 2 and may receive responses back from the server 2. The RPC server 2 directs the processing of the request from the RPC clients 3. The notification clients 5 may receive a notification when some event occurs while the RPC server 2 is processing an RPC request.

Processing of requests in the server 2 is carried out on a first-in-first-out (FIFO) basis. That is, the RPC requests from the RPC clients 3 are processed in the order in which they are received. Furthermore, the responses back from the RPC server 2 to the RPC clients 3 are provided after completion of the processing. In a busy system, the RPC requests from the clients 3 may arrive at the RPC server 2 simultaneously, or nearly simultaneously. However, since the RPC server 2 is a single-thread processor, all the RPC requests from the clients 3 are still processed in a serial fashion.

Figure 2:
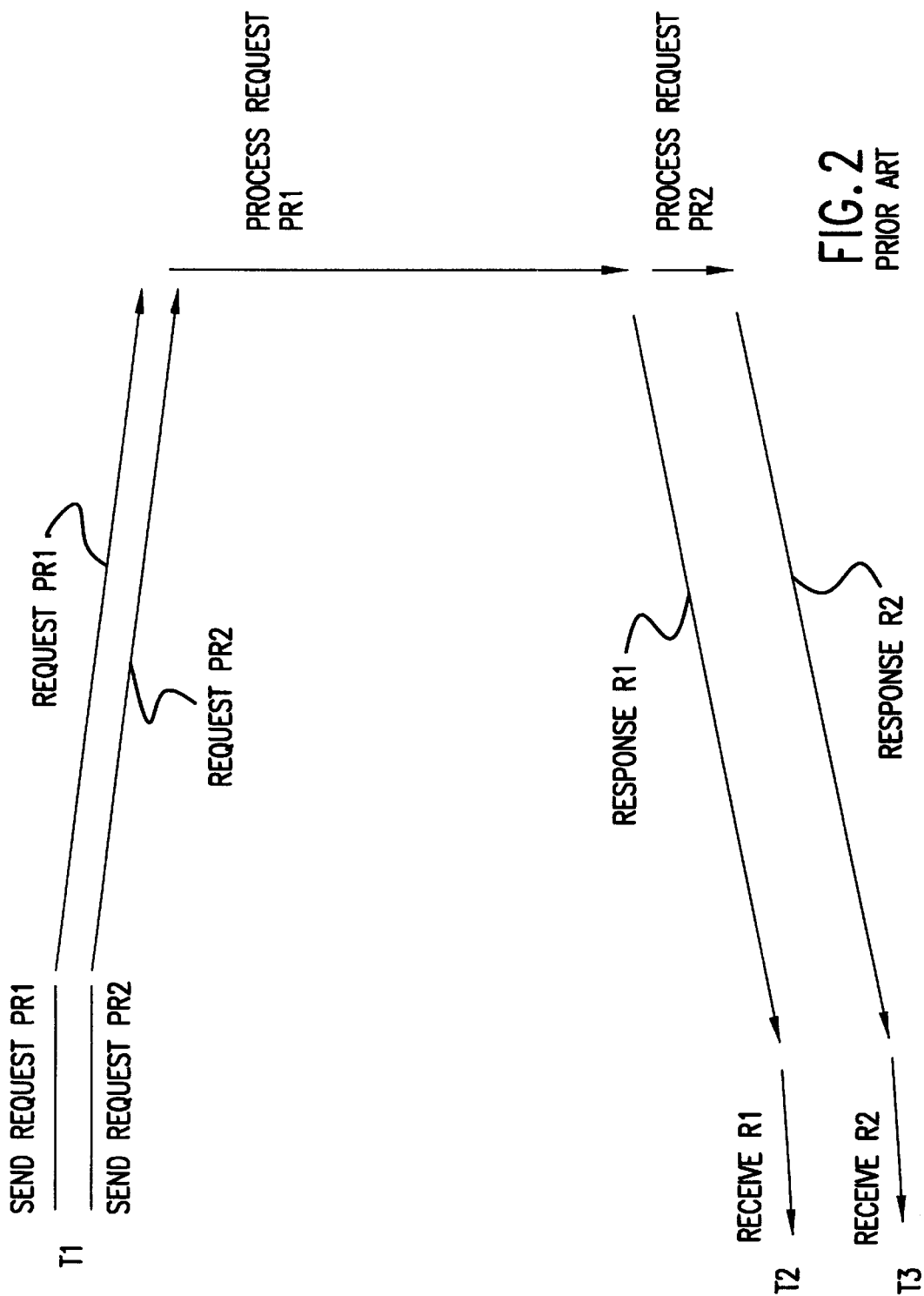
FIG. 2 is a timing chart for single-thread processing.

FIG. 2 is a timing chart showing remote procedure call (RPC) single-thread processing using the system 1 shown in FIG. 1. In FIG. 2, two RPC clients 3 have sent RPC requests PR1 and PR2, respectively, to the RPC server 2 simultaneously, or nearly simultaneously (T1). In this example, the RPC server 2 processes the first RPC request PR1 while the second request PR2 waits in a queue (T1). Upon completing the first RPC request PR1 (T2), the RPC server 2 sends a first response R1 to the respective RPC client 3 and begins processing the second RPC request PR2. After completing the second RPC request PR2 (T3), the RPC server 2 sends a second response R2 to the respective RPC client 3. If the first RPC request PR1 requires a substantial amount of time to complete, the second RPC client 3 will not receive the second response R2 for a substantial period of time, even if the processing for the second RPC request PR2 would normally take a very short period of time. If, for example, the first RPC request PR1 needs thirty seconds to be processed and the second RPC request PR2 requires only one second, the second RPC client 3 will receive the second response R2 after thirty-one seconds. When more than two RPC requests arrive at the server 2 simultaneously, or nearly simultaneously, the delay in receiving a response back can be even more significant.

Figure 3:
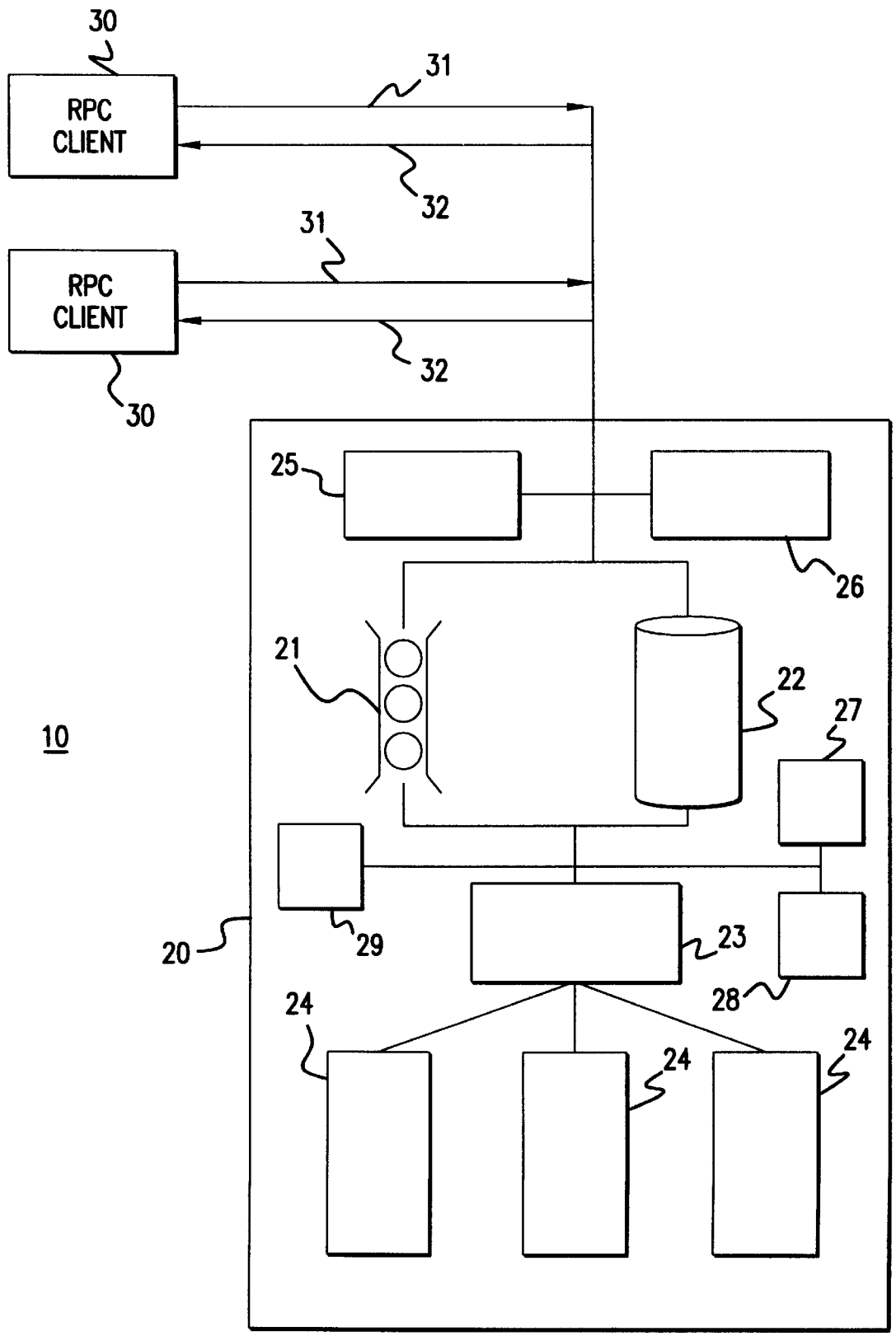
FIG. 3 is a block diagram of the multi-thread processing system according to this invention.

FIG. 3 is a block diagram of a multi-thread RPC system 10 that solves this problem. The multi-thread RPC system 10 includes an RPC server 20 connected to one or more RPC clients 30. Alternatively, the RPC system 10 may include more than one RPC server 20. The RPC server 20 includes a queue 21 and a database 22. The RPC server 20 also includes at least four modules, or threads: a spawning thread 23, processing threads $24_n$, a response thread 25 and a recovery thread 26. The spawning thread 23 picks up the RPC requests from the queue 21 and spawns processing threads $24_1$–$24_i$, where i equals the number of RPC requests waiting in the queue 21. The response thread 25 and the spawning thread 23 runs continuously unless some event, such as a shutdown of the RPC server 20, occurs. The processing threads $24_n$ process the RPC requests. However, the number of concurrent processing threads $24_n$ may be restricted to limit the amount of processing resources tied up during processing of the RPC requests. A processing thread counter 27 is incremented each time the spawning thread 23 creates a processing thread $24_i$. When the spawning thread 23 tries to spawn a new processing thread $24_i$, if the processing thread counter 27 has reached a predetermined value, the spawning thread 23 waits until a condition variable 28 is signaled. The processing thread counter 27 is decremented and the condition variable 28 is signaled each time a processing thread $24_i$ is closed.

The RPC requests are received by the RPC server 20 from the RPC clients 30 over the request lines 31. The response for each RPC request is provided back to the RPC client over the corresponding response line 32.

The RPC requests from the RPC clients 30, when received at the RPC server 20, are placed in the queue 21 by the response thread 25 in the order in which they are received. The response thread 25 also saves the RPC requests in the database 22. The response thread 25 then immediately notifies the spawning thread 23 of the new RPC requests added to the queue 21.

The response thread 25 provides the response back to the RPC client 30 via the response line 32 when the RPC request is placed in the queue 21. After sending back the response to RPC client 30, the response thread 25 signals a condition variable 29, which may cause the spawning thread 25 in an idle state to be woken up and start processing the RPC requests in the queue 21.

Thus, the RPC client 30 is immediately informed that the RPC server 20 has received the RPC request. Furthermore, upon receiving the response, the RPC client 30 assumes the RPC server 20 has actually completed the RPC request, and continues its own processing operations on that basis, even though the RPC request may still be in the queue.

As long as the processing thread counter 27 remains below a predetermined value and there is sufficient processing resources to spawn another processing thread $24_n$, the spawning thread 23 retrieves one of the RPC requests from the queue 21 and immediately spawns a processing thread $24_n$ to process that RPC request.

The database 22 is used in case of a fault with the RPC server 20 that precludes or otherwise interrupts processing of the RPC requests for which a response has been sent to the appropriate RPC client 30. This is necessary because the RPC client 30 is immediately informed via the response line 32 that the RPC server 20 has received the RPC request. If the RPC server 20 fails in some fashion and the database 22 not provided, the RPC request may not be processed, but the RPC client will have a response indicating the RPC request was performed. Therefore, by providing the database 22, once the RPC server 20 is again operating correctly, it can retrieve the received and queued RPC requests that have not been processed from the database 22, and process these RPC requests. The recovery thread 26 checks the database 22 to determine if there are any unprocessed requests. If there are, the recovery thread 26 selects the oldest RPC request stored in the database 22 and restores it to the queue 21.

Figure 4:
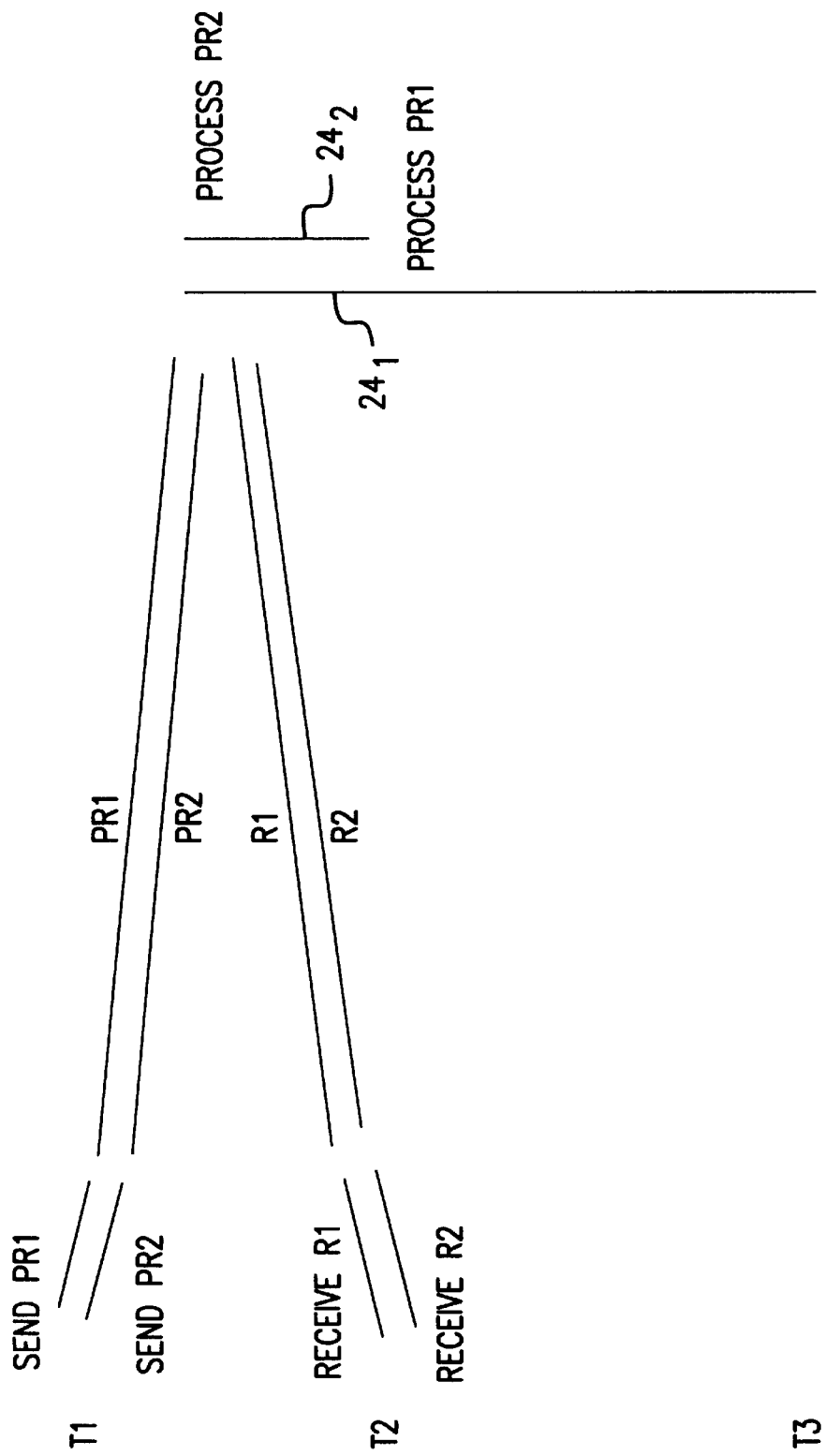
FIG. 4 is a timing chart for multi-thread processing with queuing.

FIG. 4 is a timing chart showing multi-thread RPC processing according to this invention. In FIG. 4, a first client 30 sends the first RPC request PR1 and a second client 30 sends the second RPC request PR2 to the RPC server 20 for processing. The first and second RPC requests PR1 and PR2 arrive at the RPC server 20 substantially simultaneously (T1). The request PR1 takes substantially longer to process than the request PR2. When both the first and second PRC requests PR1 and PR2 arrive at the RPC server 20, they are immediately placed in the queue 21 and corresponding entries are made in the database 22 (T1). Processing threads $24_1$ and $24_2$ are spawned to begin processing of the separate PR1 and PR2 requests in parallel. In addition, as soon as the RPC requests PR1 and PR2 are placed in the queue 21, the RPC server 20 sends the responses R1 and R2 back to the respective clients 30, indicating that the RPC requests PR1 and PR2 have been processed (T1). Because the RPC server 20 is processing the first and second RPC requests PR1 and PR2 in parallel, the response time does not depend on any already-accepted RPC requests. Therefore, the response time is much faster than that of a single-thread RPC server. Processing of the second RPC request PR2 ends at T2 and processing of the first RPC request PR1 ends at T3.

The responses R1 and R2 shown in FIG. 4 can be a simple indication that the RPC requests have been processed at the RPC server 20, or merely that the RPC requests have been received. Additionally, the responses R1 and R2 could contain data concerning the processing, such as the expected completion time.

Figure 5:
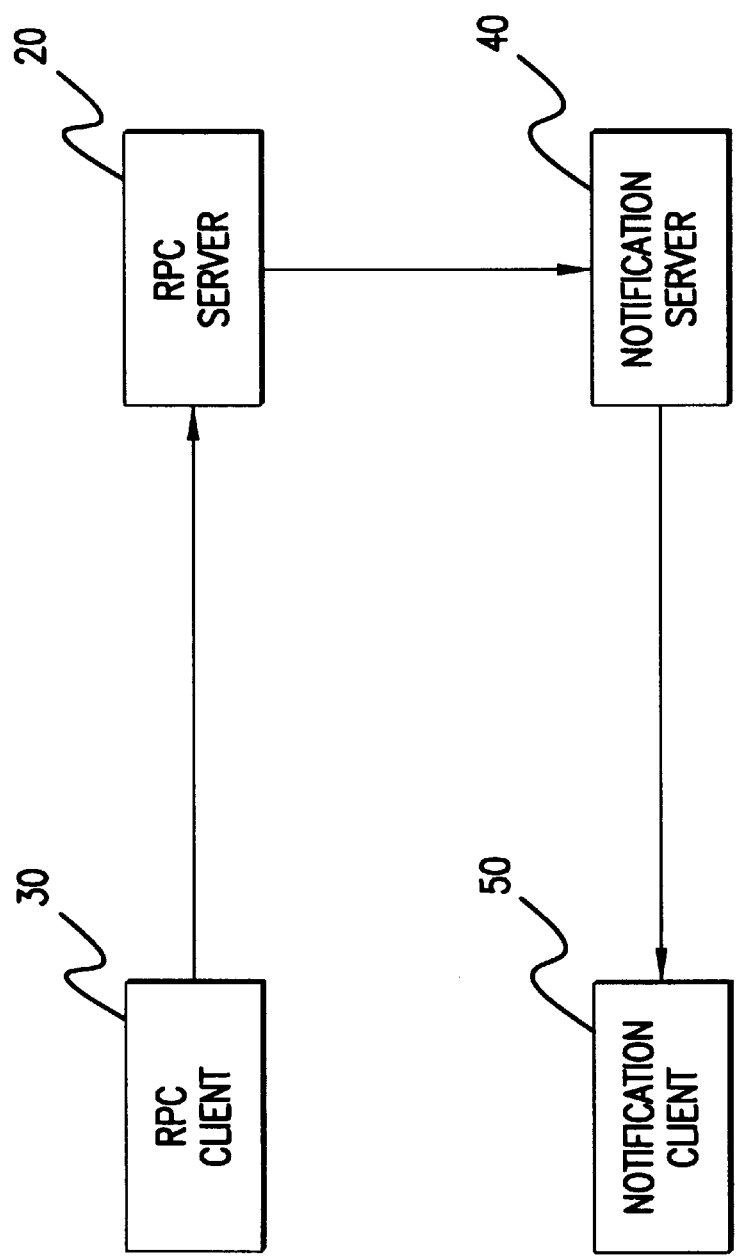
FIG. 5 is a block diagram of the notification server and related components.

FIG. 5 shows an application of the invention. In FIG. 5, the RPC clients 30 send the RPC requests PR1 and PR2 to the RPC server 20 as before. However, the multi-thread RPC system 10 now includes a notification server 40 that can send event notifications $N_i$ to a notification client 50. That is, when some event occurs while the RPC server 20 is processing an RPC request, the RPC server 20 sends a "SendEvent" request to the notification server 40. The request and response between the RPC server 20 and the notification server 40 is also an RPC. That is, the "RPC client" is the RPC server 20 and the "RPC server" is the notification server 40 for "SendEvent" operation. The notification server 40 is then responsible for sending the notification $N_i$ to the notification client 50, using a method specified in a notification profile. The notification profile may be included in the data of the "SendEvent" request. The data sent to the notification server 40 can include an event identification number, additional information for the event and the notification profile, which includes the delivery method and the delivery address. The notification server 40 creates human readable event messages from the event identification number and the additional information and then sends the notification to the delivery address using the delivery method specified.

Figure 6:
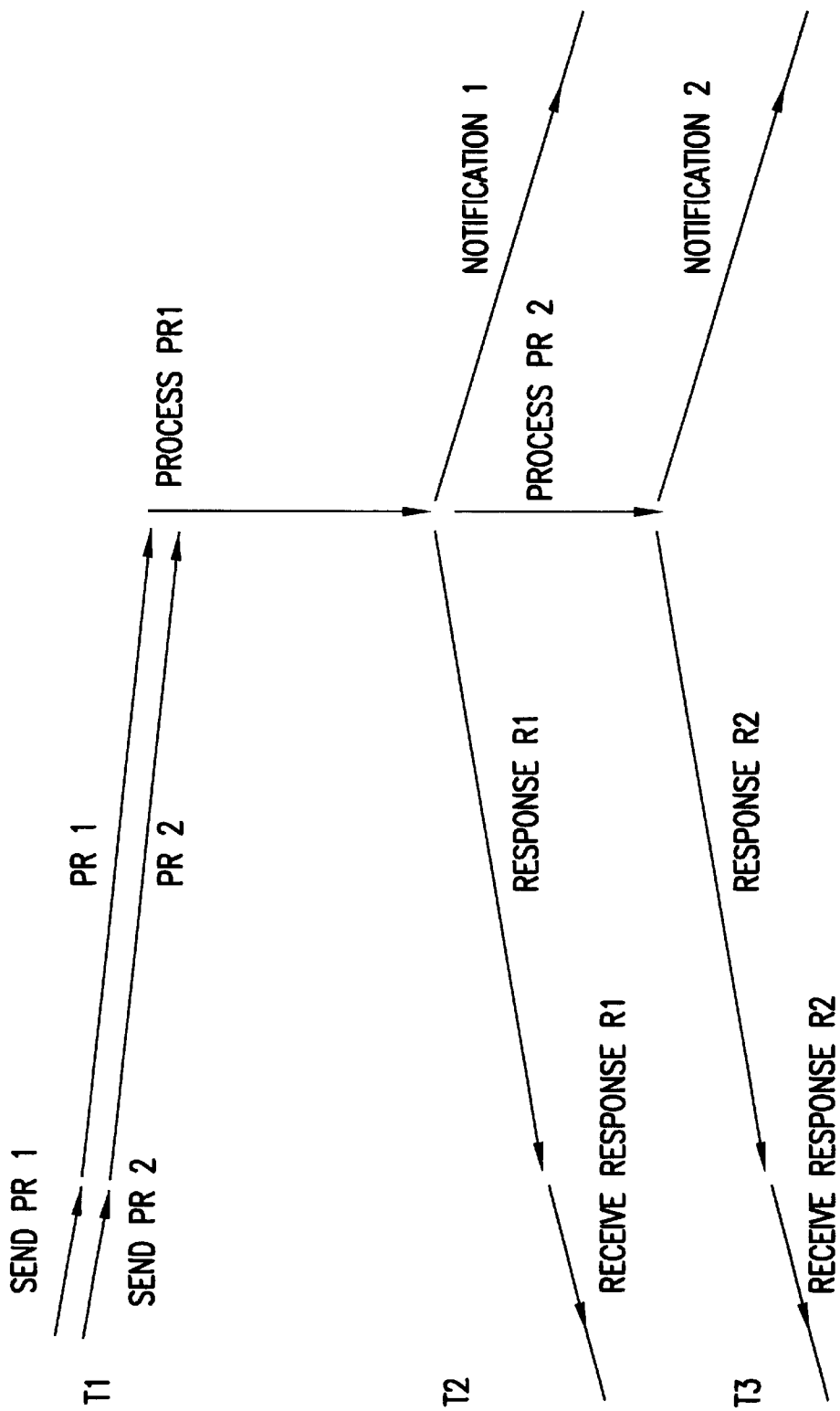
FIG. 6 is a timing chart for single-thread processing with notification.

FIG. 6 shows single-thread RPC processing of event notification using the single thread RPC processing system of FIG. 5. In this case, two RPC servers 20 send the "SendEvent" RPC request PR1 and PR2 to the notification server 40 simultaneously, or substantially simultaneously (T1). As shown in FIG. 6, upon completion of processing PR1, the notification server 40 provides the response R1 back to the RPC server 20, and then starts processing the "SendEvent" RPC request PR2 (T2). After completion of processing PR1 and PR2, the notifications N1 and N2 are provided to the notification clients 50 at T2 and T3, respectively. Thus, one RPC server 20 receives a response at T2, corresponding to the end of processing the first "SendEvent" request PR1. In addition, the notification server 40 sends the notification N1 to the respective notification client 50. However, the event notification N2 for the second "SendEvent" request PR2 is not provided until both the first RPC request PR1 and the second RPC request PR2 have been completely processed (T3), because the notification server 40 processes the RPC requests in a serial fashion.

Figure 7:
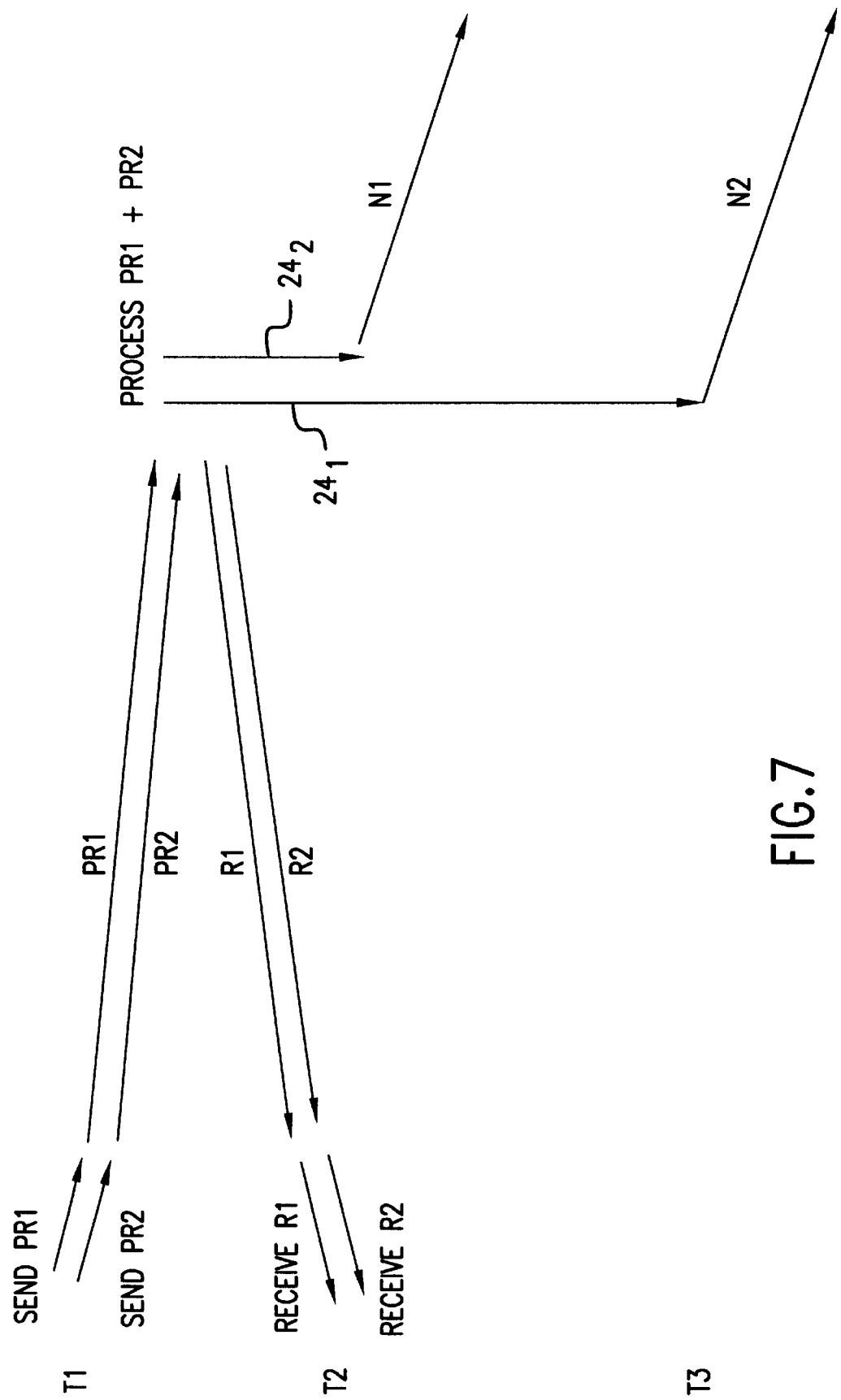
FIG. 7 is a timing chart for multi-thread processing with notification.

FIG. 7 is a timing chart showing multi-thread RPC processing of the event notification. The processing shown in FIG. 7 is similar to that shown in FIG. 4, except that the notification client 50 is provided with a notification $N_i$ at the conclusion of the "SendEvent" processing. Two RPC servers 20 send the first and the second RPC requests PR1 and PR2 to the notification server 40. The first and second "SendEvent" requests PR1 and PR2 arrive at the notification server 40 simultaneously, or substantially simultaneously (T1). The response thread 25 loads the first and the second "SendEvent" requests PR1 and PR2 into the queue 21 and the database 22 and immediately returns the first and the second responses R1 and R2 to the respective RPC servers 20 (T1). Processing of the first and the second RPC requests PR1 and PR2 then proceeds in a parallel fashion using processing threads $24_1$ and $24_2$. Because the second process request PR2 is completed in a short time (T2), for example one second, the respective notification client 50 is notified of the event without any additional delay waiting for completion of processing the first request PR1. At the conclusion of processing of the first "SendEvent" request PR1 (T3), the notification N1 is forwarded to the respective notification client 50. Thus, the delay in notifying the notification clients 50 encountered when using a single-thread notification server is also eliminated.

In FIG. 5, the notification client 50 is shown as separate or distinct from the RPC client 30. However, the RPC client 30 and the notification client 50 can be the same entity. In addition, the notification $N_i$ from the notification client 50 can include additional data concerning the events that occurred in the RPC server 20, including the time when event has occurred, for example.

In the example shown in FIG. 7, two RPC servers 20 send the first and the second "SendEvent" requests PR1 and PR2 to the notification server 40. However, the invention is not limited to only two RPC requests. Any number of "SendEvent" requests may be received simultaneously, or nearly simultaneously, and any number of previously received "SendEvent" requests can already be in the queue 21. There may, however, be a practical limit on the number of "SendEvent" requests that can be processed in parallel. Accordingly, the notification server 40 may include a hard limitation on the number of RPC requests that will be processed in parallel.

Figure 8:
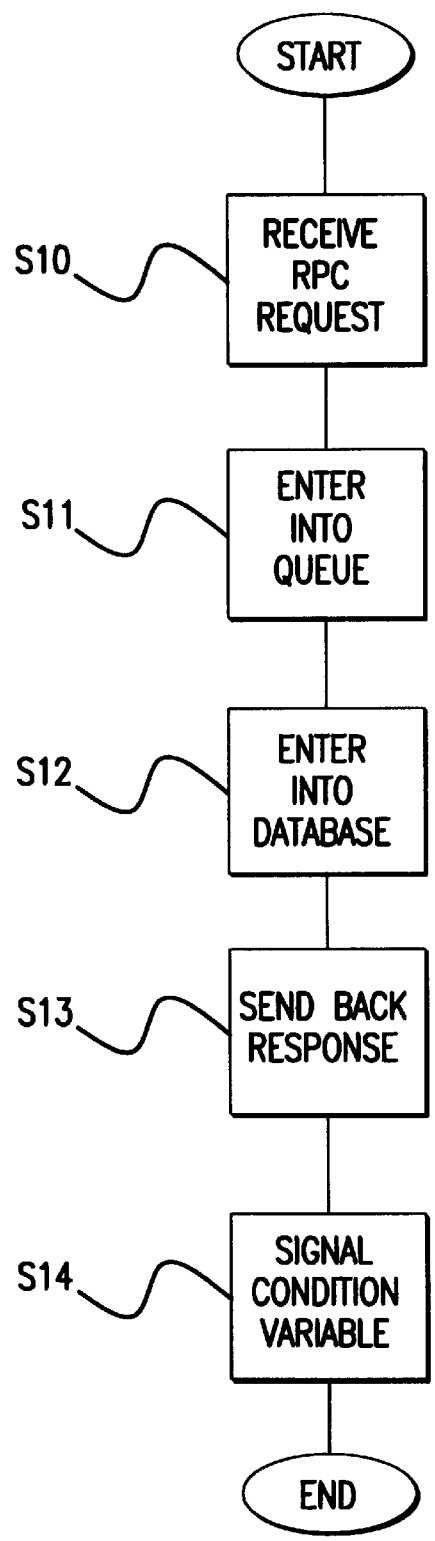
FIG. 8 is a flow diagram for implementing the response threaded subroutine.

FIGS. 8–11 are flowcharts for implementing the multi-thread RPC processing. FIG. 8 shows the response thread subroutine. In step S10, the RPC server 20 receives a new RPC request from an RPC client 30.

Next, repeats in step S11, the new RPC request is placed in the queue 21. Then, in step S12, the new RPC request is stored in the database 22.

Next, in step S13, the RPC server 20 sends a response $R_i$ back to the RPC client 30 indicating receipt of the new RPC request.

Next, in step S14, the condition variable 29 is signaled. If the spawning thread 25 is in idle state, this step causes the spawning thread start processing the RPC requests in the queue 21.

The steps S10–S14 are then repeated.

Figure 9:
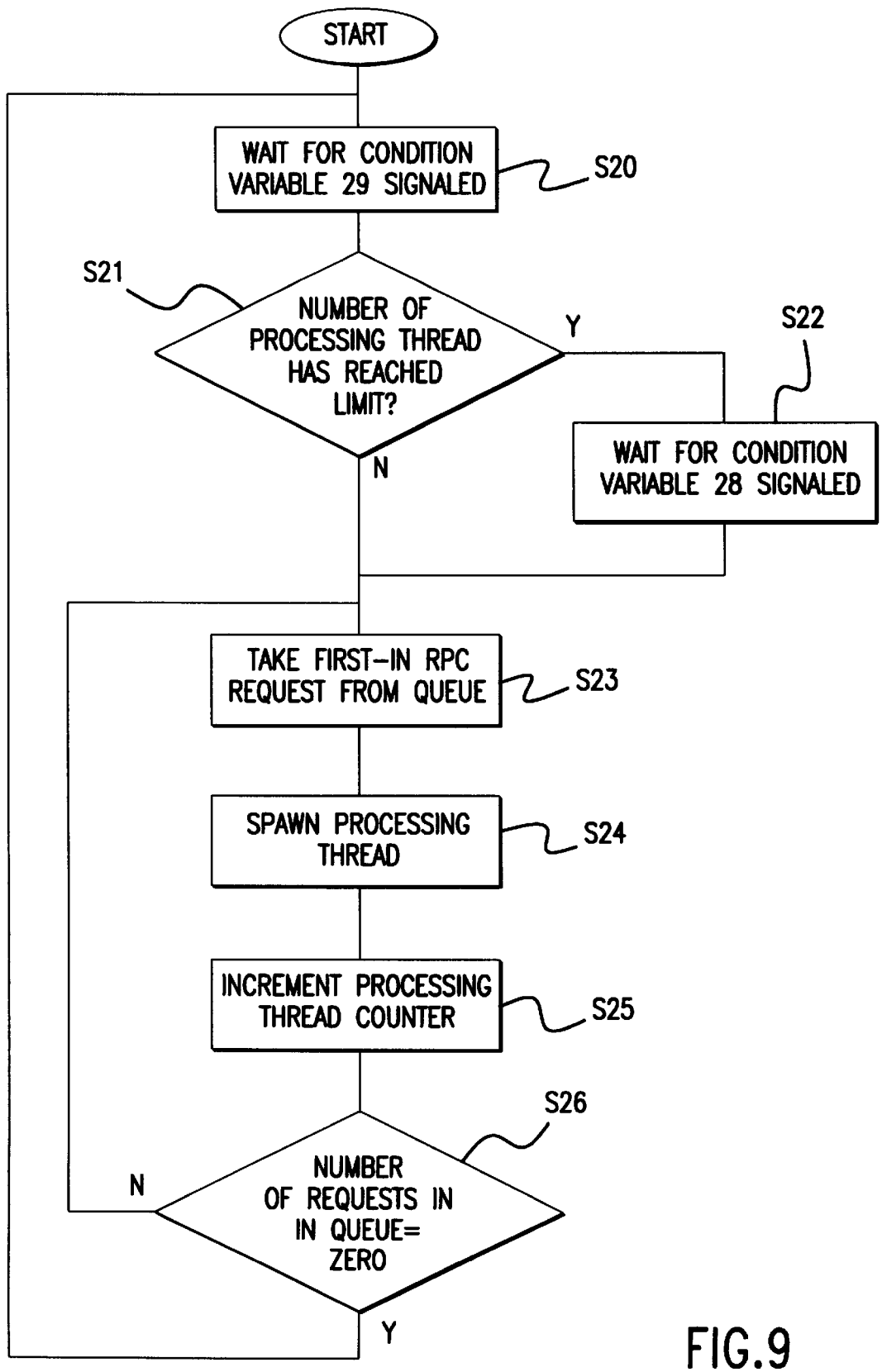
FIG. 9 is a flow diagram for implementing the spawning thread subroutine.

FIG. 9 shows the thread spawning routine. In step S20, the RPC server waits until the condition variable 29 has been signaled by the response thread 25.

In step S21, the RPC server 20 determines the processing thread counter 27 has reached a predefined value. If the processing thread counter 27 has reached a predefined value, the process moves to step S22. Otherwise, the process jumps to step S23.

Then, in step S22, the RPC server 20 waits for the condition variable 28 has been signaled by one of the already running processing threads $24_i$.

In step S23, the spawning thread 23 takes the oldest (first-in) RPC request $PR_i$ from the queue 21. The process then moves to step S24. In step S24, the spawning thread 23 spawns a thread $24_n$ for processing the RPC request $PR_i$. The process then moves to step S25. In step S25, the processing thread counter 27 is incremented by 1. The process then moves to step S26. In step S26, the RPC server 20 determines if there are RPC requests in the queue 21. If there are RPC requests in the queue 21, the process returns to step S23. Otherwise the process returns to step S20.

Figure 10:
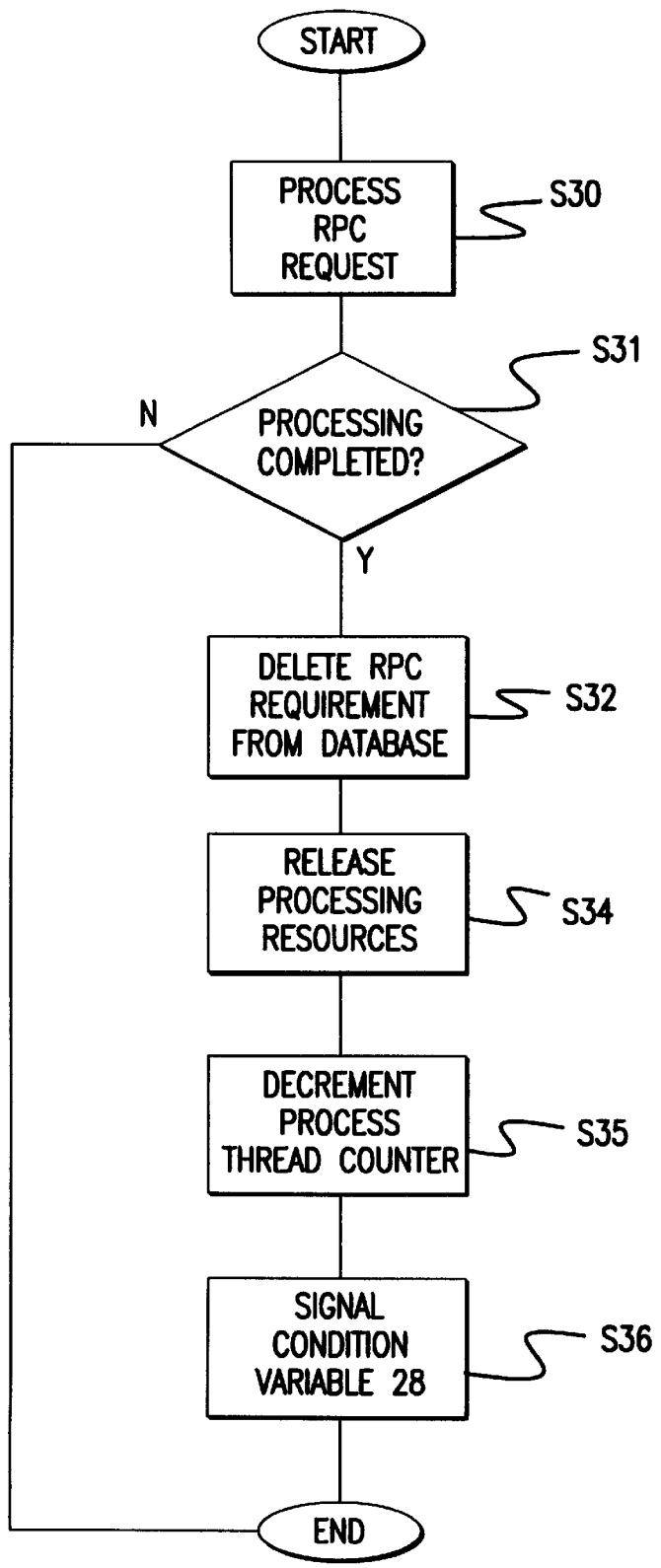
FIG. 10 is a flow diagram for implementing the processing thread subroutine.

FIG. 10 shows the processing routine of an exemplary RPC processing thread 24. In step S30, the processing thread $24_n$ begins to process the RPC request $PR_i$. The process then moves to step S31. In step S31, if the processing is complete, the process moves to step S32. Otherwise, if the processing is not complete, the process ends with an error. In step S32, the RPC request $PR_i$ is deleted from the database 22. The process then moves to step S34.

In step S34, the processing resources for the thread $24_n$ for processing request $PR_i$ are released. The process then moves to step S35. In step S35, the processing thread counter 27 is decremented by 1. In step 36, the condition variable 28 is signaled. The process then ends.

Figure 11:
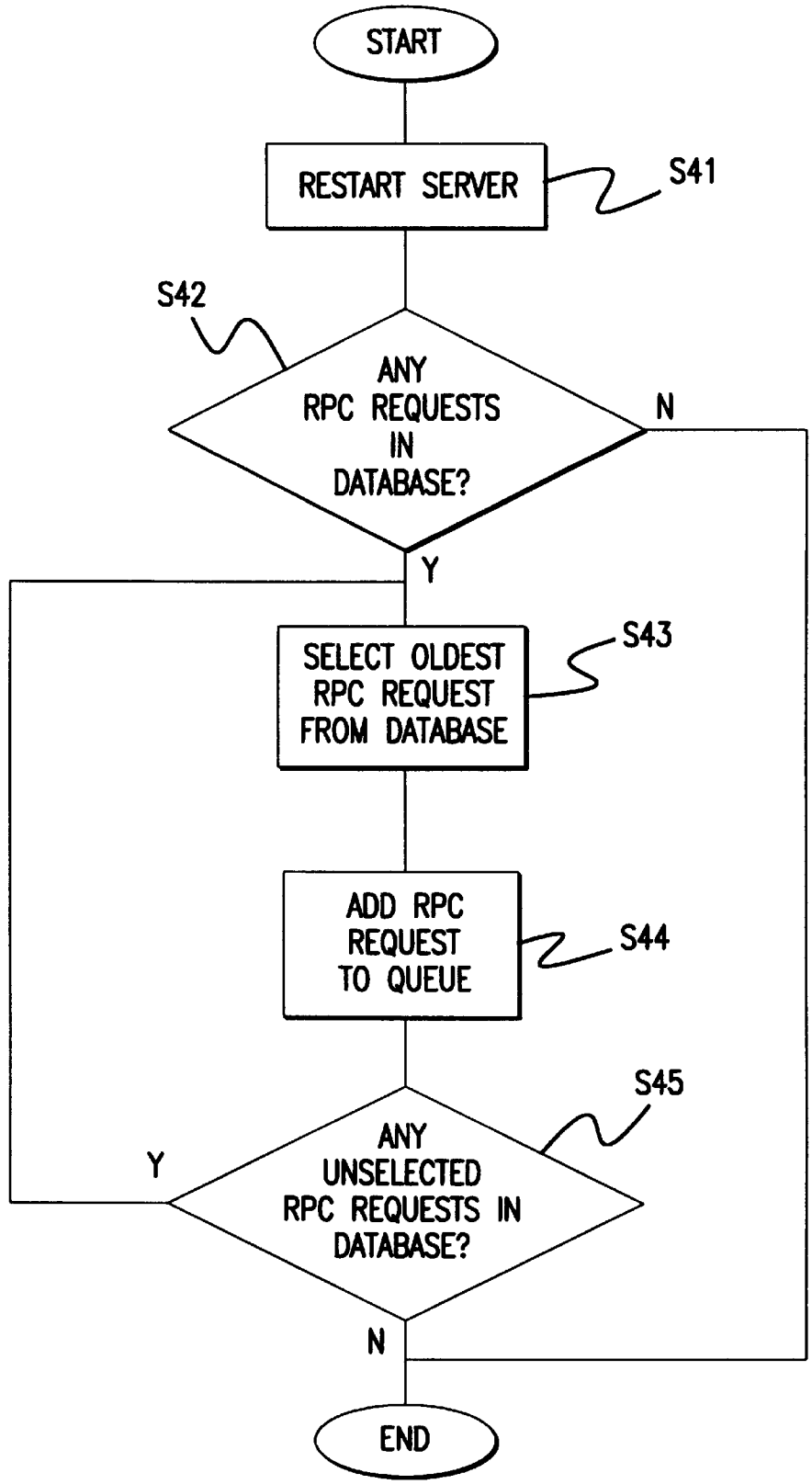
FIG. 11 is a flow diagram for implementing the recovery thread subroutine.

FIG. 11 shows the recovery routine. In step S41, the RPC server 20 is restarted following a fault. The process then moves to step S42. In step S42, the RPC server determines if there are any RPC requests in the database 22 that are in the queue 21. If there are no such RPC requests in the database 22, the process ends. Otherwise, the process moves to step S43. In step S43, the oldest (first-in) RPC request is copied from the database 22. The process then moves to step S44. In step S44, the selected RPC request is added to the queue 21. The process then moves to step S45. In step S45, the RPC server 20 again determines if there are any RPC requests in the database 22 that are not in the queue 21. If there are any RPC requests in the database 22, the process returns to step S43. Otherwise, the process ends.

In the illustrated embodiments, suitably programmed general purpose computers control the described data processing. However, the processing functions could also be implemented using a single purpose integrated circuit (e.g., ASIC) having a main or central processor section for overall system level control and separate circuits dedicated to performing various specific computational, functional and other processes under control of the central processor section. Processing can also be implemented using separate dedicated or programmable integrated electronic circuits or devices (e.g., hardwired electronic or logic devices such as discrete circuit elements, PALs, PLAs, DLDs, FPGAs and the like). In general, any device or assembly a device is on which a finite state machine capable of implementing the flowcharts of FIGS. 8–11 can be used to control the data processing.

The invention has been described with reference to the preferred embodiments thereof, which are illustrative and not limiting. Various changes may be made without departing from the spirit and scope of the invention as defined in the following claims.

What is claimed is:

1. A computer system, comprising:

at least one client;

a first server that receives processing requests from the at least one client;

means for placing the processing requests in a queue;

means for parallel processing a number of the processing requests; and means for returning a response to the at least one client after a received processing request is placed in the queue, without waiting for the received processing request to be completed.

2. The computer system of claim 1, further comprising:

means for storing the processing requests in a memory; and means for retrieving the processing requests from the memory in the event of a computer system fault, the retrieving means placing the retrieved processing requests in the queue.

3. The computer system of claim 1, wherein the means for parallel processing comprises means for selecting a queued processing request from the queue and for providing the selected processing request to one of a plurality of processing means for processing the selected request.

4. The computer system of claim 3, wherein each of the plurality of processing means receives the selected request, processes the selected request, and then deletes the selected request from the memory.

5. The computer system of claim 4, further comprising notification means for notifying a notification client when an event has occurred while the first server is processing the selected request.

6. The computer system of claim 5, wherein the notification means comprises a second server, the second server receiving a request from the first server when an event has occurred while the first server is processing the selected request, and sending an event notification to the notification client.

7. The computer system of claim 6, wherein the event notification provides additional data to the notification client.

8. The computer system of claim 6, wherein the first server and the second server are the same server.

9. The computer system of claim 6, wherein the number of requests to be processed in parallel is limited to a predetermined number.

10. A method for processing requests in a computer system, comprising:

receiving a processing request from a client;

placing the processing request in a queue, the queue containing at least one processing request;

storing the processing request into an external device;

returning a response to the client after placing the respective processing request into the queue, without waiting for the received processing request to be completed;

retrieving one of the at least one processing request from the queue; and processing the retrieved processing request.

11. The method of claim 10, further comprising deleting the retrieved processing request from the external device upon completing the processing request.

12. The method of claim 11, further comprising:

sending a request to a server upon completing the processing request; and sending an event notification to a notification client upon receiving the request by the server.

13. The method of claim 12, further comprising: determining if at least one processing request is stored in the external device;

reading each stored processing request from the external device when the server has been re-started; and placing the read processing requests into the queue in an order corresponding to their receipt by the server.

14. A computer system, comprising:

at least one client;

a server that receives the processing requests from the at least one client;

a module that places the processing requests in a queue and returns a response to a submitting one of the at least one client after a received processing request is placed in the queue, without waiting for the received processing request to be completed.

15. The computer system of claim 14, wherein the module stores the processing requests in a external device.

16. The computer system of claim 15, further comprising a second module that retrieves the processing requests from the external device in the event of a computer system fault and places the retrieved requests in the queue.

17. The computer system of claim 15, further comprising:

a second module that selects a queued processing request from the queue; and a third module that processes in parallel a number of the selected queued processing requests.

18. The computer system of claim 17, wherein a processing request is deleted from the external device following processing by the third module.

19. The computer system of claim 18, further comprising a notification server, the notification server receiving a first request from the server when an event has occurred while the server is processing the selected request and then sending an event notification to a notification client.

20. The computer system of claim 17, further comprising:

a counter, the counter counting the number of selected queued processing requests; and a limiter that controls selection of additional queued processing requests by the second module based on the number of selected queued processing requests counted by the counter.

* * * * *